(12) United States Patent
Laguia-Barnola et al.

(10) Patent No.: US 10,308,369 B2
(45) Date of Patent: Jun. 4, 2019

(54) AIRCRAFT WITH A WING TIP COMPRISING A FUEL POD

(71) Applicant: AIRBUS OPERATIONS LIMITED, Bristol (GB)

(72) Inventors: Roger Laguia-Barnola, Bristol (GB); Matthew Noel Orchard, Bristol (GB); Norman Wood, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 16/220,177

(22) Filed: Dec. 14, 2018

(65) Prior Publication Data

US 2019/0118962 A1  Apr. 25, 2019

Related U.S. Application Data

(62) Division of application No. 14/933,321, filed on Nov. 5, 2015, now Pat. No. 10,183,757.

(30) Foreign Application Priority Data

Nov. 12, 2014 (GB) .................................. 1420138.8

(51) Int. Cl.
| | |
|---|---|
| *B64D 37/04* | (2006.01) |
| *B64C 23/06* | (2006.01) |
| *B64C 3/38* | (2006.01) |
| *G06Q 10/06* | (2012.01) |
| *G06Q 30/06* | (2012.01) |

(52) U.S. Cl.
CPC ................ *B64D 37/04* (2013.01); *B64C 3/38* (2013.01); *B64C 23/069* (2017.05); *G06Q 10/06313* (2013.01); *G06Q 30/0621* (2013.01); *Y02T 50/164* (2013.01)

(58) Field of Classification Search
CPC .. B64C 3/38; B64C 3/56; B64C 45/00; B64C 23/069; B64D 37/04; B64D 45/00
See application file for complete search history.

(56) References Cited

U.S. PATENT DOCUMENTS 1,112,126 A * 9/1914 Emmons ................... B64C 3/14
244/35 R
2,575,534 A   11/1951 Stoughton
(Continued)

FOREIGN PATENT DOCUMENTS

GB        1087784        10/1967

OTHER PUBLICATIONS

Search Report dated Janin Great Britain Application No. 1420138.8 dated May 7, 2015.

(Continued)

*Primary Examiner* — Justin M Benedik
(74) *Attorney, Agent, or Firm* — Nixon & Vanderhye P.C.

(57) ABSTRACT

An aircraft is disclosed having a wing, the wing having a connection interface at the tip of the wing, and the wing being interchangeable between a first configuration in which a first wing tip is connected to the connection interface, and a second configuration in which a second wing tip is connected to the connection interface to replace the first wing tip. The second wing tip comprises a fuel pod for carrying additional fuel, and a wing tip device for improving aerodynamic efficiency. The wing may be designed for performance in both configurations.

10 Claims, 5 Drawing Sheets

(56) References Cited

U.S. PATENT DOCUMENTS

| | | | | |
|---|---|---|---|---|
| 2,984,439 | A | * | 5/1961 | Fletcher .................. B64D 37/04 244/130 |
| 3,199,813 | A | | 8/1965 | Roper |
| 4,776,542 | A | * | 10/1988 | Van Dam .................. B64C 3/10 244/198 |
| 5,350,135 | A | * | 9/1994 | Renzelmann ............. B64C 3/56 244/49 |
| 6,089,502 | A | * | 7/2000 | Herrick ..................... B64C 3/10 244/35 R |
| 7,624,951 | B1 | | 12/2009 | Kraft et al. |
| 2005/0133672 | A1 | * | 6/2005 | Irving .................. B64C 23/072 244/201 |
| 2006/0076460 | A1 | | 4/2006 | Snow, Jr. et al. |
| 2007/0018049 | A1 | * | 1/2007 | Stuhr .................... B64C 23/069 244/124 |
| 2014/0117150 | A1 | * | 5/2014 | Good ....................... B64C 3/56 244/49 |

OTHER PUBLICATIONS

Photographs of Nimrod MRA4 aircraft disclosed in paragraph [0004] of the specification illustrating fuel pods at the wing tips.
Photograph of B-45 Tornado aircraft disclosed in paragraph [0004] of the specification illustrating fuel pods at the wing tips.
Photographs of Lockheed Super Constellation aircraft disclosed in paragraph [0004] of the specification illustrating fuel pods at the wing tips.
Photographs of Learjet 23 aircraft disclosed in paragraph [0004] of the specification illustrating fuel pods at the wing tips.
Photograph of Learjet 24 aircraft disclosed in paragraph [0004] of the specification illustrating fuel pods at the wing tips.

* cited by examiner

AIRCRAFT WITH A WING TIP COMPRISING A FUEL POD

CROSS RELATED APPLICATIONS

This application is a Divisional Application of U.S. patent application Ser. No. 14/933,321, filed September Nov. 5, 2015, which claims priority benefit to Great Britain Patent Application No. 1420138.8, filed Nov. 12, 2014, the entire contents of all of which are hereby incorporated by reference.

BACKGROUND OF THE INVENTION

The present invention relates to aircraft and aircraft wings, and more particularly to aircraft with wings for receiving a wing tip comprising a fuel pod, and to methods of designing such wings.

It has been recognised that it may be desirable for aircraft to be able to efficiently operate over a variety of different mission profiles. For example, it may be desirable for an airline to be able to operate a passenger aircraft over a first mission profile having a short range for part of a year (for example the summer), but to also be able to operate the aircraft over a second mission profile having a medium (i.e. longer) range for another part of the year (for example the winter).

To increase the range of an aircraft it is usually necessary to increase the fuel capacity.

It is known to provide fuel capacity by locating permanent fuel pods on aircraft wing tips. For example GB 1087784 discloses an aircraft having wing tip pods. Furthermore the Nimrod MRA4, the B-45 Tornado, Lockheed Super Constellation and Learjets 23 and 24 all have fuel pods at the wing tips. In these above-mentioned aircraft, the wings are designed specifically for performance with the fuel pod fitted. Where the extra capacity of the fuel pod is not required (e.g. for shorter range mission profiles) the aircraft performance is sub-optimal because there remains a drag and weight penalty from the fuel pod, and unnecessary structural margins in the wing. This restricts the commercial feasibility of regularly running an aircraft with permanent wing tip fuel pods, over a range of different mission profiles.

Some military aircraft have single-use fuel pods (often referred to as 'drop tanks') that are mounted on the wing tips and can be jettisoned after use. U.S. Pat. No. 2,575,534 describes an aircraft having a 'drop tank'. These fuel pods can be used to extend the range of an aircraft for particular mission profiles, but are unsuitable for use on commercial passenger aircraft. Furthermore, the wings of such aircraft are typically designed for use without the drop tank, and therefore have relatively poor performance with the tank fitted. This restricts the commercial feasibility of regularly running an aircraft with such wing tip fuel pods fitted.

It is desirable to provide an aircraft that can more efficiently operate over a variety of different mission profiles.

SUMMARY OF THE INVENTION

According to a first aspect of the invention, there is provided an aircraft comprising an aircraft wing, the wing having a connection interface at the tip of the wing, and the wing being interchangeable between a first configuration in which a first wing tip is connected to the connection interface, and a second configuration in which a second wing tip is connected to the connection interface to replace the first wing tip, characterised in that the second wing tip comprises a fuel pod and wherein the wing has been designed for performance in both the first and the second configurations.

By designing the wing for performance in both the first configuration and the second configuration, the present invention provides a wing that can readily be used with either the first or the second wing tip. This means the functionality of the same basic aircraft can be readily modified simply by changing the wing tip, without necessarily requiring any other re-engineering of the wing. Furthermore, by providing a connection interface capable of receiving a second wing tip that comprises a fuel pod, the range of the aircraft can easily be increased.

This not only gives the aircraft operator more flexibility in how to use the aircraft (for example they may wish to operate different mission profiles depending on the season), but also increases the potential re-sale value of the aircraft because that flexibility is also available to later operators of the aircraft.

The second wing tip may also comprise a wing tip device. The wing tip device is preferably arranged to improve the aerodynamic efficiency of the aircraft (relative to the wing tip device not being present). The wing tip device may thus at least partially offset, or mitigate, the drag resulting from the presence of the fuel pod. For example, the wing tip device may be a span extension that increases the L/D ratio of the aircraft (relative to an arrangement in which the device is not present). Providing a second wing tip that comprises the combination of a fuel pod and a wing tip device, is especially beneficial in increasing the range of an aircraft having a fixed payload because there is not only additional fuel capacity (in the fuel pod), but the fuel is also efficiency used by virtue of having the wing tip device. In some embodiments, the maximum take-off weight (MTOW) may need to increase. However, the aerodynamic efficiency improvements enabled by the wing tip device may enable this increase in MTOW to be kept relatively small (which tends to be desirable for aircraft certification purposes). Furthermore, providing a fuel pod at the wing tip may offset, to at least some extent, any increase in wing root bending moment caused by the addition of the wing tip device; this may therefore facilitate a relatively light-weight wing.

According to a second aspect of the invention, there is provided an aircraft comprising a wing, the wing having a connection interface at the tip of the wing, and the wing being interchangeable between a first configuration in which a first wing tip is connected to the connection interface, and a second configuration in which a second wing tip is connected to the connection interface to replace the first wing tip, characterised in that the second wing tip comprises a fuel pod for carrying fuel and a wing tip device for improving aerodynamic efficiency.

The wing tip device and the fuel pod of the second wing tip may be arranged such that the aircraft has substantially similar handling qualities in the second configuration as in the first configuration. The aerodynamics of the fuel pod may be designed such that the aircraft has substantially similar handling qualities in the second configuration as in the first configuration. Alternatively or additionally, the position of the fuel pod may be designed such that the aircraft has substantially similar handling qualities in the second configuration as in the first configuration. For example, the centre of mass of the fuel pod may be positioned along the axis of twist of the wing, such that when the wing changes from the first to the second configuration, the twist of the wing is not altered.

The fuel pod is preferably positioned above or co-incident with the lower surface of the wing. Such an arrangement has been found to be beneficial because it enables the fuel to be gravity-fed in the event of a pump failure.

In some embodiments of the invention, the first wing tip may be, or may comprise, a wing tip device. In some embodiments of the invention, the first wing tip may simply be an end-cap on the wing. In some embodiments of the invention, the first wing tip may comprise a fuel pod. The capacity of the fuel pod in the first wing tip is preferably different to the capacity of the fuel pod in the second wing tip. Such an arrangement enables the aircraft to operate over different ranges.

The aircraft is preferably arranged such that in the second configuration, the second wing tip is unable to be disconnected from the interface during flight. For example, the fuel pod is preferably not a drop tank. The wing may only be interchangeable between the first and second configurations when it is on the ground. The wing is preferably not interchangeable between the first and second configurations during flight. The aircraft is preferably arranged such that in the first configuration, the first wing tip is unable to be disconnected from the interface during flight.

The connection interface is configured to receive the first and the second wing tips. The connection interface may be configured to receive a multiplicity of different wing tips. The wing is preferably interchangeable between a multiplicity of configurations in each of which a different respective wing tip is connected to the connection interface. The wing is preferably designed for performance in the multiplicity of configurations. The aircraft may, therefore, be able to efficiently operate over a multiplicity of different mission profiles. Providing a common connection interface is especially advantageous in enabling the wing tips to be readily changed.

According to another aspect of the invention there is provided a kit of parts comprising: an aircraft as described herein, a first wing tip having a connector for connecting to the connection interface, and a second wing tip having a connector for connecting to the connection interface such that the first and second wing tips can be interchangeably used on the wing for flying different mission profiles. The kit of parts may comprise a multiplicity of wing tips, each being connectable to the connection interface such that the wing tips can be interchangeably used on the wing for flying different mission profiles.

According to another aspect of the invention there is provided a method of designing a wing for an aircraft, the wing having a connection interface at its tip for receiving a plurality of different wing tips, and the wing being interchangeable between a first configuration in which a first wing tip is connected to the connection interface, and a second configuration in which the first wing tip is replaced by a second wing tip connected to the connection interface, wherein the second wing tip comprises a fuel pod and characterised in that the method comprises the step of designing the wing for performance in both the first and the second configurations.

The wing is designed for performance in both the first configuration and the second configurations. It will be appreciated that in each one of these configurations, the wing design may be sub-optimal, however the present invention recognises that by designing for both configurations a better balance of performance can be achieved (in comparison to purely designing for one configuration as per the prior art). This, in turn enables the advantages of having interchangeable wing tips to be more-fully realised.

The method of designing may be a method of re-designing an existing wing design. When re-designing an existing wing, the method may comprise the step of modifying the existing wing to the re-designed specification.

The first wing tip is preferably designed for use during a first mission profile having a first range. The second wing tip device is preferably configured for use during a second mission profile having a second range. The first and second mission profiles are different. For example, the first mission profile may be a short-range mission, whereas the second mission profile may be a longer-range mission. The present invention enables the same basic aircraft wing to be used for either mission by simply attaching the appropriate wing tip to the wing.

It will be appreciated that reference to a mission profile need not relate to a military mission. Indeed, the mission profile is preferably for a commercial passenger aircraft. The mission profile may be defined in a number of ways. The mission profile may include a range. The mission profile may include a cruise speed. The mission profile may include an altitude, for example a cruise altitude.

Wing design is typically a balance between structural and aerodynamic considerations. The aerodynamic characteristics of the wing may have been designed for performance in both the first configuration and the second configuration. The structural characteristics of the wing may have been designed for performance in both the first configuration and the second configuration. Both the structural and the aerodynamic characteristics of the wing may have been designed for performance in both the first configuration and the second configuration.

The step of designing the wing may comprise designing for the aircraft flying a first mission profile in the first configuration, and for the aircraft flying a second mission profile in the second configuration.

According to another aspect of the invention there is provided a method of designing a wing tip for an aircraft wing, the aircraft wing having redundant structural margins, wherein the wing tip comprises a fuel pod and a wing tip device, and wherein the method comprises the steps of designing the fuel pod and the wing tip device such that when the wing tip is attached to the wing, at least some of the redundant structural margins of the wing are used during flight of the aircraft. This aspect of the invention recognises that a wing may have redundant structural margins (for example redundant structural capacity that has arisen due to the existence of other aircraft components and their influence on the wing structure), and that those can be used by appropriately tailoring the design of the fuel pod and wing tip device. The method of designing the wing tip, is preferably used in conjunction with the above-described method of designing a wing, as part of an iterative design process.

The step of designing the wing tip may comprise (i) calculating aerodynamic performance of an initial design of the wing tip; (ii) calculating the structural loads created by the wing tip in use; (iii) calculating the use of the redundant structural margins, by the loads in step (iii); and (iv) iteratively repeating steps (i) to (iii) for variants of the initial design of wing tip, until a final design of wing tip is reached.

According to yet another aspect of the invention there is provided a method of increasing the range of an aircraft, the method comprising the steps of: having a wing of the aircraft configured in a first configuration in which a first wing tip is connected to a connection interface on the tip of the wing, the first configuration being designed for use during a first mission profile having a first range, identifying a second mission profile, and when the aircraft is on the ground, modifying the wing to a second configuration, in which second configuration a second wing tip is connected to the connection interface to replace the first wing tip, the second wing tip comprising a fuel pod for carrying fuel and a wing tip device for improving aerodynamic efficiency, such that in the second configuration the aircraft can fly a second mission profile having a second range, greater than the first range, the fuel pod being arranged to carry additional fuel for that second mission such that the payload in the first and second configurations can remain constant.

By configuring the aircraft in the second configuration, there is additional fuel capacity and the aircraft is relatively aerodynamically efficient by virtue of the wing tip device. The aircraft may thus be able to operate over an increased range whilst maintaining the same payload as the first configuration.

According to yet another aspect of the invention there is provided a method of preparing an aircraft for sale, the method comprising (i) offering an aircraft for sale, the aircraft having a wing with a connection interface at the tip thereof; (ii) offering a customer a plurality of different wing tips for connection to the connection interface, each wing tip device being designed for use in a respective mission profile and at least one of the wing tips comprising a fuel pod; and (iii) receiving a selection from the plurality of wing tip devices, from the customer. The method may comprise the step of (iv) connecting the selected wing tip to the connection interface of the wing.

It will be appreciated that any features described with reference to one aspect of the invention are equally applicable to any other aspect of the invention. For example, features described with reference to a method are equally applicable to an apparatus (and vice versa). Furthermore, features described with reference to a method/apparatus of one aspect may also be applicable to a method/apparatus of another aspect.

DESCRIPTION OF THE DRAWINGS

Embodiments of the present invention will now be described by way of example only with reference to the accompanying schematic drawings of which.

DETAILED DESCRIPTION

Figure 1:
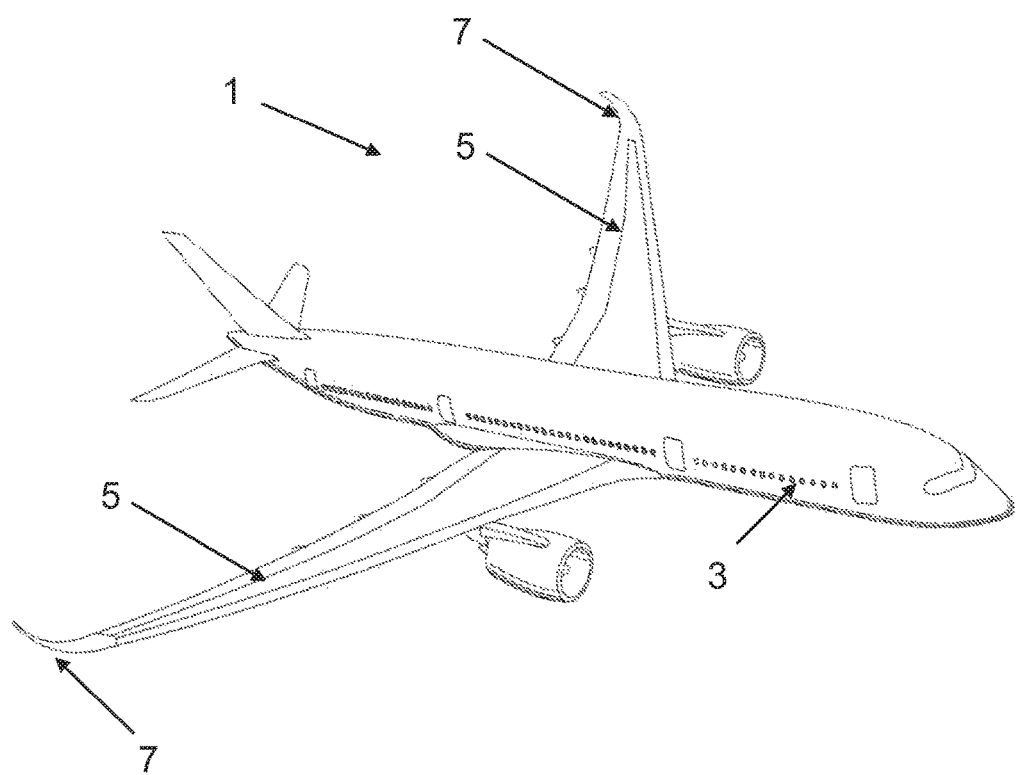
FIG. 1 shows an aircraft according to a first embodiment of the invention.

FIG. 1 shows a passenger aircraft 1 according to a first embodiment of the invention. The aircraft 1 comprises a fuselage 3 and wings 5. The aircraft is shown with its wings in a first configuration in which a winglet 7 is mounted on the end of the wing.

Figure 2A:
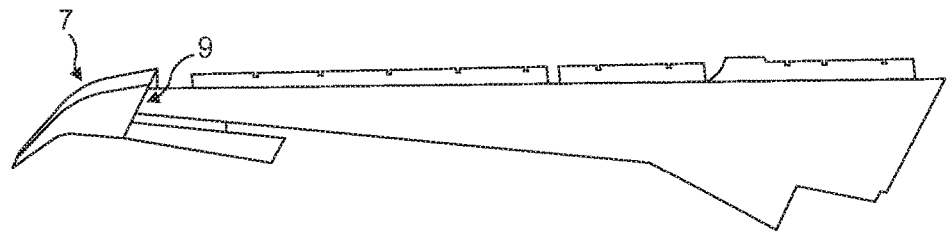
FIGS. 2a to 2c are schematics showing part of a wing of the aircraft in FIG. 1 in three different configurations.
Figure 2B:
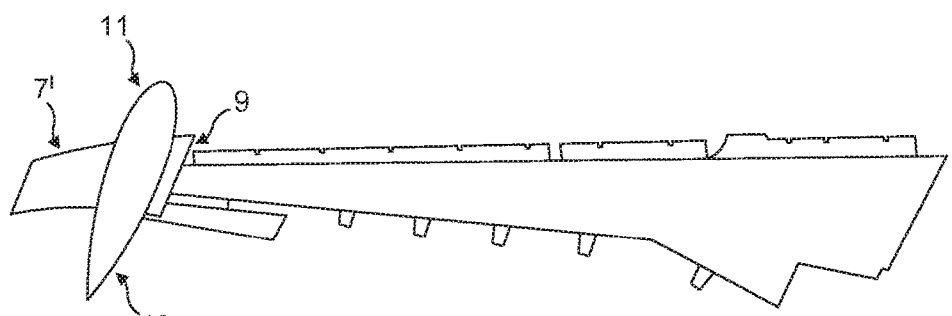
Figure 2C:
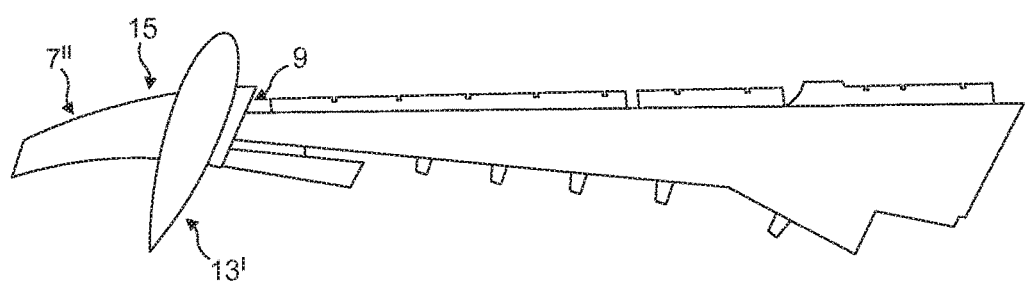

The winglet 7 attaches to its respective wing 5 at a wing-box-to-wing-tip connection interface 9 (not visible in FIG. 1 but see FIGS. 2a to 2c). In the first embodiment of the invention, the connection interface 9 is arranged to receive three different wing tips: firstly, the winglet 7 in FIGS. 1 and 2a, secondly a wing tip 11 comprising the combination of fuel pod 13 and winglet 7' in FIG. 2b, and thirdly a wing tip 15 comprising the combination of fuel pod 13' and (another) winglet 7" in FIG. 2c. The structure of the wing tips and the related advantages will now be described in more detail with reference to FIGS. 2a to 4.

FIGS. 2a to 2c are schematics showing part of a wing 5 of the aircraft in FIG. 1 in three different configurations. In FIGS. 2a to 2c, the wing flaps and ailerons are not shown.

FIG. 2a shows the wing 5 in a first configuration, in which the wing tip comprises the winglet 7. The winglet 7 is joined to the wing at the connection interface 9.

FIG. 2b shows the wing in a second configuration, in which the wing tip of FIG. 2a, has been replaced with a different, second, wing tip 11. The second wing tip 11 comprises both a winglet 7' and a fuel pod 13. This wing tip 11 is connected to the same connection interface 9. The winglet 7' is larger than the winglet 7 of the first wing tip and increases the wing span to 38m (compared to 36m with the first wing tip).

FIG. 2c shows the wing 5 in a third configuration, in which the wing tip 11 of FIG. 2b, has been replaced with a different, third, wing tip 15. The third wing tip 15 comprises a larger fuel pod 13' and a different (larger) winglet 7". This third wing tip 15 is connected to the same connection interface 9. The winglet 7" is larger than the winglets 7 and 7' of the other wing tips and increases the wing span to 42m.

By providing a common connection interface 9 arranged to receive all the wing tips of FIGS. 2a to 2c, it is possible for different wing tips to interchangeably be installed on the wing 5, depending on which wing tip is most suitable for a particular mission profile. This enables the aircraft 1 to be relatively flexible in its use. Furthermore, by providing a wing tip which comprises a fuel pod, the use of the aircraft is especially flexible because the range of the aircraft can readily be increased.

As shown in FIGS. 2b and 2c, in the second and third configurations the wing tips 11, 15 comprise both a fuel pod 13, 13' and a wing tip device 7', 7". The wing tip device increases the effective span of the aircraft (the span increase in FIG. 2c being even greater than the span increase in FIG. 2b). In both configurations this span increase facilitates improved aerodynamic efficiency (compared to just adding the fuel pod in isolation). Providing wing tips that comprise the combination of a fuel pod and a wing tip device, is especially beneficial in increasing the range of an aircraft having a fixed payload (for example a fixed passenger capacity). This is because there is not only additional fuel capacity (in the fuel pod), but the fuel is also more efficiency used by virtue of having the wing tip device . . . . By way of example with reference to the first embodiment, the aircraft 1 can carry 170 passengers over a range of around 2700 nm in the first configuration in FIG. 2a; it can carry 170 passengers over a range of around 3500 nm in the second configuration in FIG. 2b, and it can carry 170 passengers over a range of around 3900 nm in the third configuration in FIG. 2c. The MTOW is increased slightly such that the aircraft is able to operate in the second and third configurations.

Figure 3A:
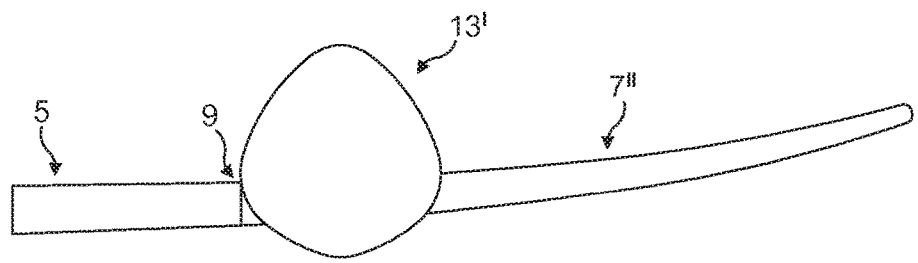
FIGS. 3a and 3b are close-up view of the wing tip in FIG. 2c.
Figure 3B:
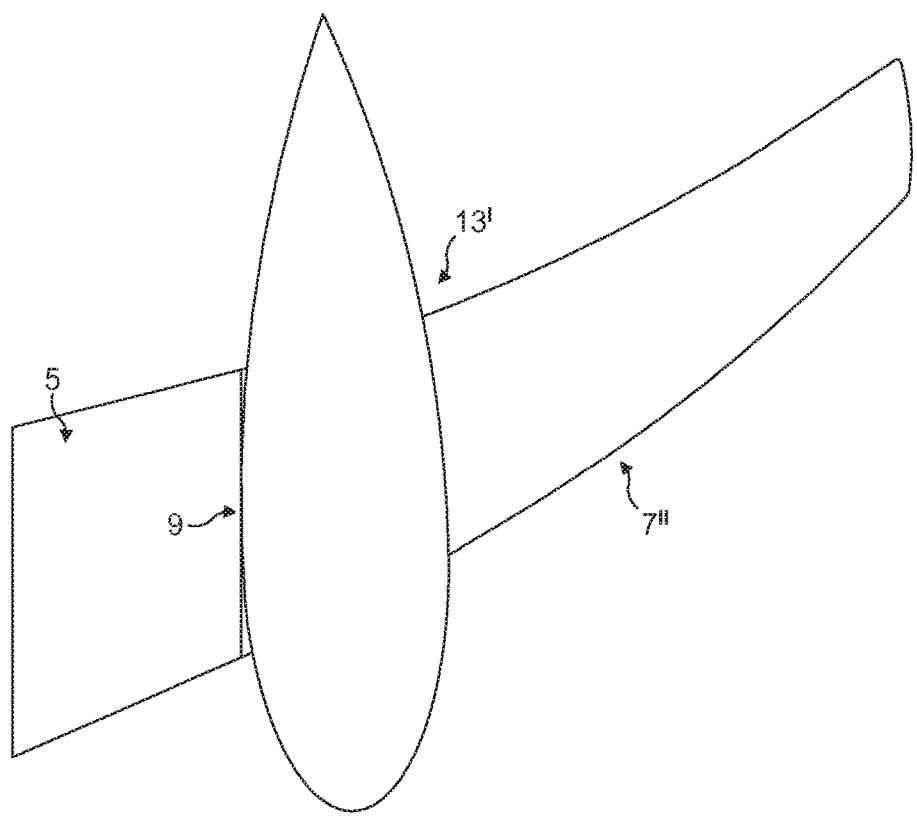
Figure 4:
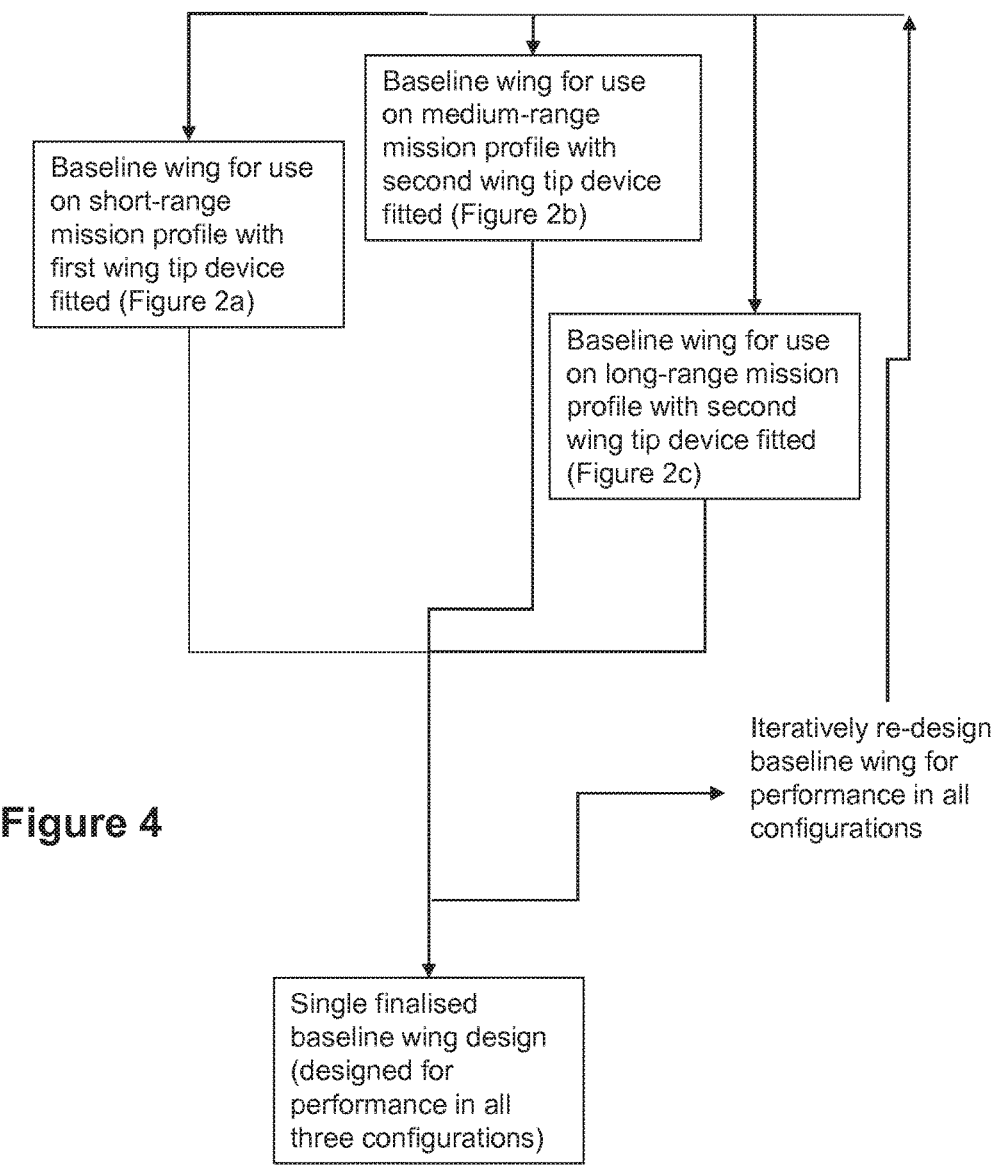
FIG. 4 is a flowchart showing a method used to design the wing of the aircraft in FIG. 1.

FIGS. 3a and 3b are close-up views of the wing tip in FIG. 2c. As shown in FIG. 3a, the fuel pod 13' is an axially-symmetric streamlined body and is mounted such that its underside is substantially flush with the lower surface of the wing 5. This arrangement ensures that the fuel in the pod is able to be access via a gravity feed, in the event of a fuel pump failure. As shown in FIG. 3b, the chord-wise location of the fuel pod 13' is such that the centre of mass of the fuel pod 13' (when full, part-full and empty) lies along the line of twist (not shown) of the wing 5. This ensures the presence of the pod 13' does not significantly alter the handling properties of the wing, when the wing is in the third configuration.

As is well known, the presence of a winglet increases the lift in the tip region of a wing and therefore increases the wing root bending moment. The arrangements in FIGS. 2*b* and 2*c* have been found to be particularly beneficial because they recognise that the increase in wing root bending moment can be offset, to at least some extent, by the weight of the fuel pod generating a bending moment in the opposite direction.

In principle, it would be possible to use the above-mentioned common connection interface 9 on an existing aircraft wing. However, that wing will have been designed for use either without a wing tip fitted at all, or with a specific wing tip device fitted. If a different type of wing tip were to be fitted (e.g. any of the tips shown in FIGS. 2*a-c*), the wing would not have been designed for performance with that different tip device. This may limit the magnitude of any benefits obtainable through use of the new wing tip.

The wings 5 of the aircraft in FIG. 1 has been designed using a novel method according to an embodiment of the present invention. That method is described in the flowchart in FIG. 4, to which reference is now made.

The method starts from a first initial wing design for use in a first configuration with the wing tip of FIG. 2*a* (i.e. the winglet 7) fitted, a second initial wing design for use in a second configuration with the wing tip 11 of FIG. 2*b* (i.e. the winglet 7' and fuel pod 13) fitted, and a third initial wing design for use in a third configuration with the wing tip 15 of FIG. 2*c* (i.e. the winglet 7" and fuel pod 13') fitted. The method comprises iteratively re-designing these initial wings (the loop on the right-hand side of FIG. 4) to arrive at a common design in which the wing is designed for performance with all of the three different wing tips fitted. This iterative design process also takes into account the different mission profiles the aircraft would fly with the respective wing tip device fitted.

Thus, whilst in each configuration in isolation the wing design may be sub-optimal, the present invention recognises that by designing for performance in all the configurations, the final wing design achieves a better balance of performance (in comparison to purely optimising for one configuration as per the prior art). This, in turn, enables the advantages of having interchangeable wing tips, comprising fuel pods, to be more-fully realised.

Figure 5:
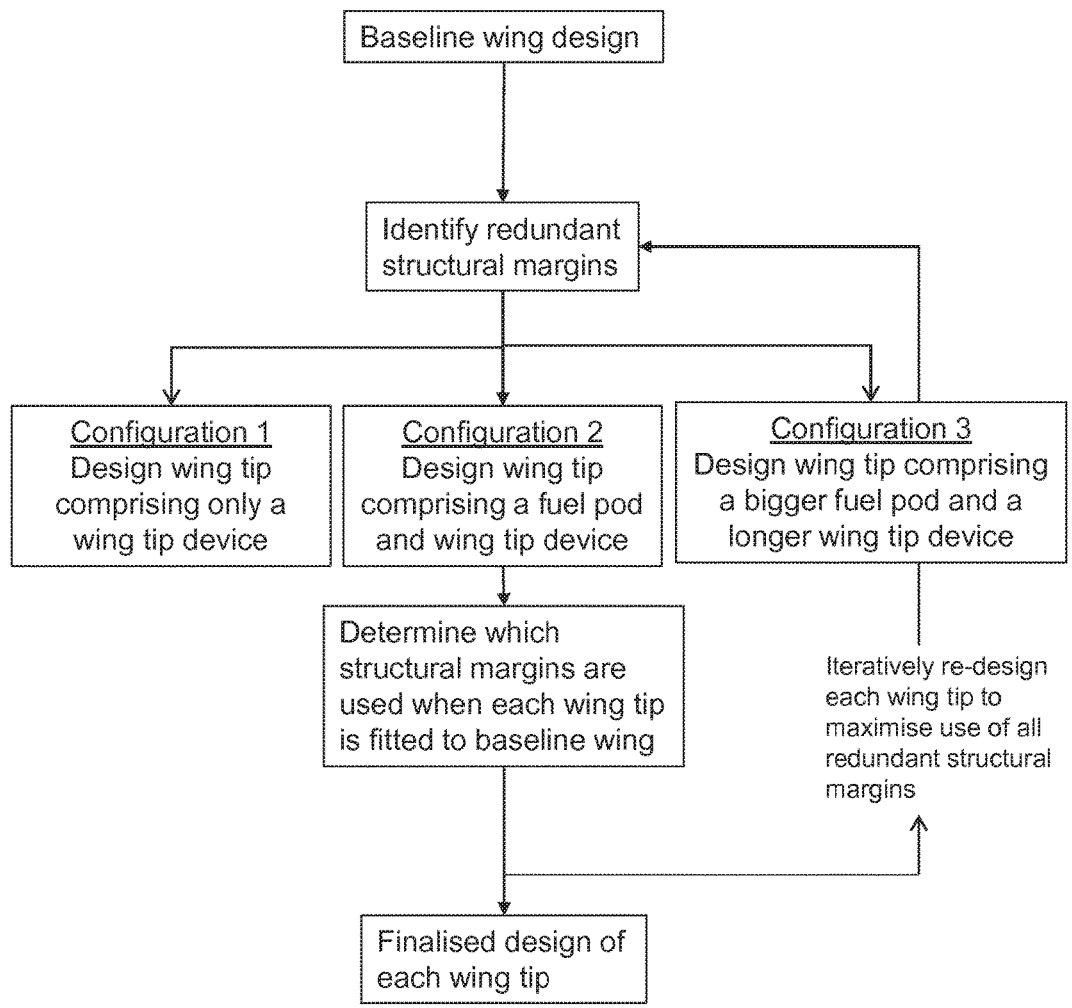
FIG. 5 is a flowchart showing a method according to a second embodiment, by which a wing tip is designed.

The first embodiment of the invention provides a wing that is designed for three different configurations of wing tip. It has been recognised that it may also be desirable to provide a combination of fuel pod and wing tip device that is designed for a particular wing. FIG. 5 is a flow-chart of a second embodiment of the invention, showing a novel method of how a wing tip was designed. The method starts from a baseline wing design and the identification of redundant structural margins in that baseline wing (for example redundant structural capacity that has arisen due to the existence of other aircraft components and their influence on the wing structure). The method comprises the steps of iteratively designing three different wing tips (a first tip that just comprises a wing tip device (configuration 1), a second tip that comprises both a fuel pod and a wing tip device (configuration 2), and a third tip that comprises a larger fuel pod and longer wing tip device (configuration 3)). Each wing tip is iteratively designed such that when the respective wing tip is attached to the wing, at least some of the redundant structural margins of the wing are used during flight of the aircraft. The second embodiment of the invention thus recognises that a wing may have redundant structural margins, and that those can be used by appropriately tailoring the wing tip design. For example in the second embodiment, the lift distribution and sweep of the wing tip devices are tailored to make use of the otherwise redundant structural margins.

Whilst the present invention has been described and illustrated with reference to particular embodiments, it will be appreciated by those of ordinary skill in the art that the invention lends itself to many different variations not specifically illustrated herein. For example, in the first configuration, the wing tip may comprise just a fuel pod (but no tip device). Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of increasing the range of an aircraft, the method comprising the steps of:
    having a wing of the aircraft configured in a first configuration in which a first wing tip is connected to a connection interface on the tip of the wing, the first configuration being designed for use during a first mission profile having a first range,
    identifying a second mission profile, and
    when the aircraft is on the ground, modifying the wing to a second configuration, in which second configuration a second wing tip is connected to the connection interface to replace the first wing tip, the second wing tip comprising a fuel pod for carrying fuel and a wing tip device for improving aerodynamic efficiency,
    such that in the second configuration the aircraft can fly a second mission profile having a second range, greater than the first range, the fuel pod being arranged to carry additional fuel for that second mission such that the payload in the first and second configurations can remain constant.

2. The method of increasing the range of an aircraft according to claim 1, wherein the first wing tip is a winglet.

3. The method of increasing the range of an aircraft according to claim 1, wherein the first wing tip comprises further comprises a fuel pod.

4. The method of increasing the range of an aircraft according to claim 3, wherein the fuel pod of the first wing tip is located adjacent to the connection interface, and the winglet extends beyond the fuel pod.

5. The method of increasing the range of an aircraft according to claim 1, wherein the first wing tip is an end-cap on the wing.

6. The method of increasing the range of an aircraft according to claim 1, wherein the wing tip device of the second wing tip is a winglet.

7. The method of increasing the range of an aircraft according to claim 6, wherein the fuel pod of the second wing tip is located adjacent to the connection interface, and the winglet extends beyond the fuel pod.

8. The method of increasing the range of an aircraft according to claim 6, wherein the span of the wing when fitted with the winglet of the second wing tip is greater than the span of the wing when fitted with the winglet of the first wing tip.

9. The method of increasing the range of an aircraft according to claim 1, wherein the first wing tip also comprises a fuel pod, the capacity of the fuel pod in the first wing tip being different to the capacity of the fuel pod in the second wing tip.

10. The method of increasing the range of an aircraft according to claim 1, further comprising the steps of:
- identifying a third mission profile, and
- when the aircraft is on the ground, modifying the wing to a third configuration, in which third configuration a third wing tip is connected to the connection interface to replace the second wing tip, the third wing tip comprising a larger fuel pod for carrying fuel and a larger winglet for improving aerodynamic efficiency,
- such that in the third configuration the aircraft can fly a third mission profile having a third range, greater than the second range, the fuel pod being arranged to carry additional fuel for that second mission such that the payload in the second and third configurations can remain constant.

\* \* \* \* \*